P. WESTER.
LOADING MACHINE FOR CARTRIDGE BELTS.
APPLICATION FILED APR. 30, 1914.

1,211,800.

Patented Jan. 9, 1917.

WITNESSES

INVENTOR
PETRUS WESTER
ATTORNEY

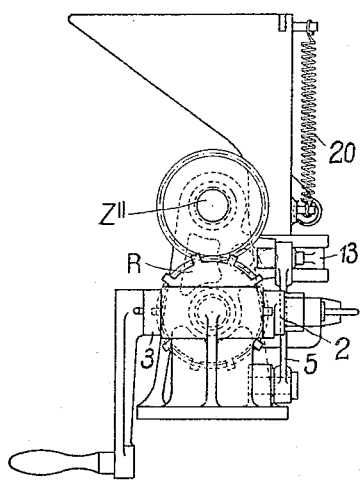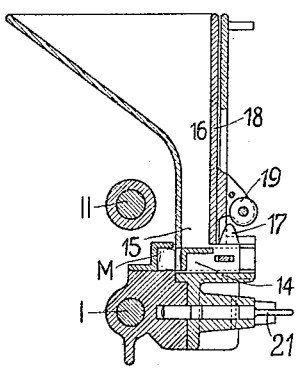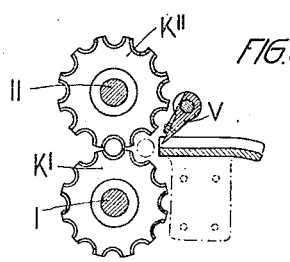

UNITED STATES PATENT OFFICE.

PETRUS WESTER, OF BERLIN, GERMANY.

LOADING-MACHINE FOR CARTRIDGE-BELTS.

1,211,800. Specification of Letters Patent. Patented Jan. 9, 1917.

Application filed April 30, 1914. Serial No. 835,411.

*To all whom it may concern:*

Be it known that I, PETRUS WESTER, citizen of the Kingdom of the Netherlands, residing at Berlin, in the German Empire, have invented new and useful Improvements in Loading-Machines for Cartridge-Belts; and I do hereby declare the following to be a full, clear, and exact description of the same.

The present invention relates to a loading machine for loading belts with cartridges.

The novelty consists in the mechanism whereby the machine, on the belt being fed through same, progressively opens the two bands of said belt between the points of connection which are formed by buckles, seams or the like. This is effected, when the entire belt has been moved forward, by holding a portion thereof fixed and moving backward a preceding portion, thereby opening the desired pocket, whereupon the cartridge is pushed into it and by a repetition of these steps the cartridges are progressively pushed into the belt pockets.

In the accompanying drawings a machine is shown adapted for loading a belt whose pockets are formed by transverse seams, preferably in back-stitch.

Figure 1:
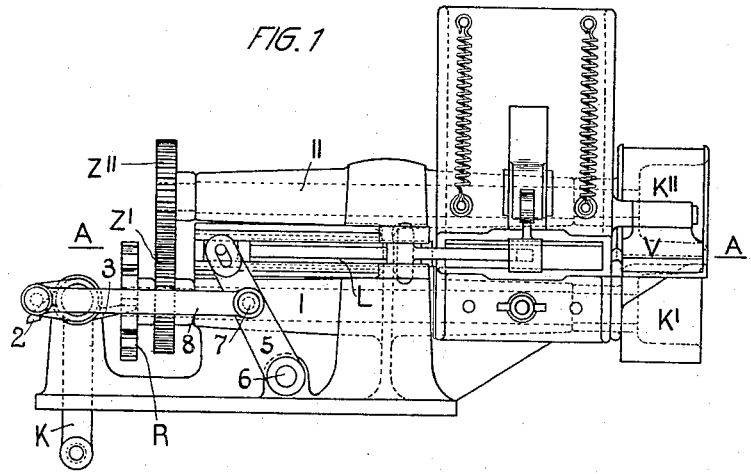
Figure 2:
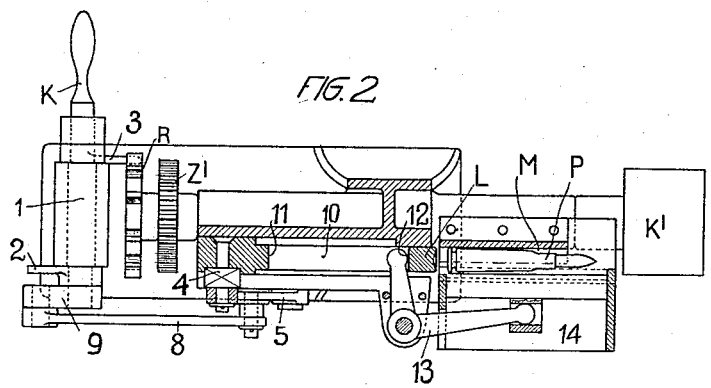

Figure 1 is a general view of the machine, Fig. 2 is a section on line A—A of Fig. 1, Fig. 3 is a front view of the crank end of the machine, Fig. 4 is a section through the feeding funnel, and Fig. 5 shows the transporter.

The transporter of the machine consists of two superposed wheels $K^I$ and $K^{II}$ furnished with teeth. The teeth of these wheels are of such formation that two superposed pairs of teeth inclose an opening or recess which is just large enough to exactly surround the cartridge in the belt. For this reason the teeth are farther apart from each other at one side than at the other side, the dimensions of the openings corresponding to the dimensions of the cartridge cases. Of these two wheels, the lowermost $K^I$ is secured on a shaft I which carries at its other end a wheel R provided with teeth. The number of the points or teeth of this wheel corresponds with that of the number of the teeth of the wheels $K^I$ and $K^{II}$. The shaft $I^I$ of the transport wheel $K^{II}$ is coupled by means of toothed gears $Z^I$ and $Z^{II}$ with the shaft I.

The drive is effected by means of the crank K which engages with a horizontal shaft 1. On this shaft are secured two cams 2 and 3, of which for instance cam 3 effects the forward movement of the band by engaging with one tooth of the wheel R thus rotating both shafts I, $I^I$ and consequently also the transporter wheels $K^I$ and $K^{II}$ in the transporting direction. Somewhat later, the cam 2 engages with a tooth of the wheel R and pushes the belt which is now held securely by the spring pawl V somewhat backward thus opening one of the pockets. The cartridge P lying in the magazine M is then pushed forward by means of a plunger L. The drive of the plunger is effected by means of a lever 5 connected to its rear end at 4, said lever 5 being rotatable about the axis 6. A connecting rod 8 engages with the lever 5 at 7 and is jointedly connected to a crank 9. This crank rotates on the rotation of the shaft 1 by the hand crank K.

In the plunger there is provided a longitudinal slot 10 by means of whose end surfaces 11 and 12 a bell crank lever 13 is controlled. The one end of said bell crank lever engages in the slot 10 and the other in a slide 14. This latter moves beneath the mouth 15 of the funnel 16 in such a manner that firstly the cartridges contained in the funnel lie upon the slide and then when the latter has been moved to the right (Fig. 4) a cartridge falls which then, on the return movement of the slide to the left, is fed into the magazine M from which it is pushed into the cartridge-belt by means of the plunger. On the slide there is provided a nose 17 by means of which a plate 18 movably arranged on the inner side of the funnel wall is moved upward and downward by the intermediary of a roller 19 and springs 20 thus shaking down the cartridges. The cartridge funnel together with slide and bell crank lever may be removed after releasing the wing-nut 21, whereupon after changing over the wheels and extending the plunger, the machine may be employed for emptying cartridge-belts.

The first movement is effected by the contact of the tooth 3 with the wheel R, whereupon the band is pushed forward. The band itself is held by the clamping device V so that on the second movement which is effected by the tooth 2 on the further rotation of the crank, the transporter is rotated backward, so that the band which is held at one end is also moved back somewhat thus opening the belt bands. Thereupon the cartridge P is fed into the opened pocket. The plunger is then withdrawn, whereupon a new cartridge is fed to the slide from the magazine.

With this machine, belts of any type may be loaded, for instance the well known buckle-belt as well as belts without buckles, for instance those of Henneveld or any other sewed or woven belts. For loading buckle-belts grooves are provided in the drums of the transporter wheels, in which the buckles can fit.

Having now described my invention what I claim as new and desire to secure by Letters Patent is:—

1. In a machine for loading cartridge belts, means for opening the pocket to be filled, comprising means for moving the belt forward, means for holding fast the rear end of the forwardly-moved belt, and means for imparting a return movement to the forward end of said belt.

2. In a machine for loading cartridge belts, means for opening the pocket to be filled comprising a pair of transporting wheels, two shafts carrying said wheels, a gear-wheel mounted on one of said shafts, and two cams operating said gear-wheel for the purpose specified.

3. In a machine for loading cartridge belts, means for opening the pocket to be filled, comprising means for moving the belt forward, means for holding fast the rear end of the forwardly-moved belt, means for imparting a return movement to the forward end of said belt, a cartridge magazine, and means for feeding the cartridge from said magazine into said pocket, substantially as hereinbefore described.

4. In a machine for loading cartridge belts, means for opening the pocket to be filled comprising a pair of transporting wheels, two shafts carrying said wheels, a gear-wheel mounted on one of said shafts, and two cams operating said gear-wheel, a cartridge magazine, a plunger for feeding the cartridge from said magazine into said pocket, means for feeding forward said plunger and means for withdrawing said plunger into its initial position, as set forth.

5. In a machine for loading cartridge belts, means for opening the pocket to be filled comprising a pair of transporting wheels, two shafts carrying said wheels, a gear-wheel mounted on one of said shafts, and two cams operating said gear-wheel, a cartridge magazine, a plunger for feeding the cartridge from said magazine into said pocket, a driving shaft, a crank situated thereon, a rocking lever operating said plunger and a connecting rod between said crank and said rocking lever, for the purpose specified.

6. In a machine for loading cartridge belts, means for opening the pocket to be filled comprising a pair of transporting wheels, two shafts carrying said wheels, a gear-wheel mounted on one of said shafts, and two cams operating said gear wheel, a cartridge magazine, a plunger for feeding the cartridge from said magazine into said pocket, a driving shaft, a crank situated thereon, a rocking lever operating said plunger, a connecting rod between said crank and said rocking lever, and means for positively and successively feeding the cartridges into the magazine, substantially as described.

7. In a machine for loading cartridge belts, means for opening the pocket to be filled comprising a pair of transporting wheels, two shafts carrying said wheels, a gear-wheel mounted on one of said shafts, and two cams operating said gear-wheel, a cartridge magazine, a plunger for feeding the cartridge from said magazine into said pocket, a driving shaft, a crank situated thereon, a rocking lever operating said plunger, a connecting rod between said crank and said rocking lever, a slide for positively and successively feeding the cartridges into the magazine, a bell-crank lever operated by said plunger and operating said slide, for the purpose specified.

8. In a machine for loading cartridge belts, means for opening the pocket to be filled comprising a pair of transporting wheels, two shafts carrying said wheels, a gear-wheel mounted on one of said shafts, and two cams operating said gear wheel, a cartridge magazine, a plunger for feeding the cartridge from said magazine into said pocket, a driving shaft, a crank situated thereon, a rocking lever operating said plunger, a connecting rod between said crank and said rocking lever, a slide for positively and successively feeding the cartridges into the magazine, a bell-crank lever operated by said plunger and operating said slide, a cartridge feeding funnel, a plate contained therein, a projection on said slide, a roller on said plate, by means of which projection and roller the plate may be raised, and springs for returning said plate to its initial position, as set forth.

9. In a machine for loading cartridge belts, means for opening the pocket to be filled comprising a pair of transporting wheels, recesses in said wheels adapted to fit the cartridges, two shafts carrying said wheels, a gear-wheel mounted on one of said shafts, and two cams operating said gear-wheel for the purpose specified.

10. In a machine for loading cartridge belts, means for opening the pocket to be filled comprising a pair of transporting wheels, grooves in said wheels to permit of the passage of buckles, two shafts carrying said wheels, a gear-wheel mounted on one of said shafts and two cams operating said gear-wheel for the purpose specified.

11. In a machine for loading cartridge belts, means for feeding the belts to be loaded, said means comprising means adapted to engage the belt at two separated points and to move one of said points toward the other whereby the members of the belt are sprung apart; and means for feeding the cartridge into the belt at the sprung-apart part.

In testimony whereof, I have signed my name to this specification in the presence of two subscribing witnesses.

PETRUS WESTER.

Witnesses:
 HEINRICH RAUCHHOLZ,
 HENRY HASPER.

Copies of this patent may be obtained for five cents each, by addressing the "Commissioner of Patents, Washington, D. C."